(12) United States Patent
Fujita et al.

(10) Patent No.: US 7,631,572 B2
(45) Date of Patent: Dec. 15, 2009

(54) BALL CIRCULATING GROOVE STRUCTURE OF BALL NUT

(75) Inventors: Hiroshi Fujita, Gyoda (JP); Shinobu Saito, Gyoda (JP); Shinichi Sakaida, Gyoda (JP); Koji Maejima, Gotendba (JP)

(73) Assignee: Showa Corporation, Gyoda-shi (JP)

( * ) Notice: Subject to any disclaimer, the term of this patent is extended or adjusted under 35 U.S.C. 154(b) by 42 days.

(21) Appl. No.: 11/761,572

(22) Filed: Jun. 12, 2007

(65) Prior Publication Data

US 2008/0121058 A1   May 29, 2008

(30) Foreign Application Priority Data

Nov. 28, 2006   (JP) .............................. 2006-320832

(51) Int. Cl.
*F16H 1/24* (2006.01)

(52) U.S. Cl. .................... 74/424.82; 74/424.87; 384/43

(58) Field of Classification Search ............. 74/424.82, 74/424.86, 424.87, 441, 443; 384/43, 44
See application file for complete search history.

(56) References Cited

U.S. PATENT DOCUMENTS

| | | | | |
|---|---|---|---|---|
| 4,272,476 A | * | 6/1981 | Benton | 264/225 |
| 4,905,534 A | * | 3/1990 | Andonegui | 74/424.87 |
| 6,439,338 B2 | | 8/2002 | Yoshioka et al. | |
| 6,736,235 B2 | * | 5/2004 | Yoshida et al. | 180/444 |
| 2004/0045388 A1 | * | 3/2004 | Sugita | 74/424.87 |
| 2005/0172487 A1 | * | 8/2005 | Kamiya et al. | 29/898.066 |
| 2005/0217401 A1 | * | 10/2005 | Osterlanger et al. | 74/424.87 |

FOREIGN PATENT DOCUMENTS

| | | | | |
|---|---|---|---|---|
| EP | 1559929 A2 | * | 8/2005 | |
| EP | 1584542 A1 | * | 10/2005 | |
| FR | 2703122 A1 | * | 9/1994 | |
| GB | 2187259 A | * | 9/1987 | |
| JP | 61-45096 | | 3/1981 | |
| JP | 10082458 A | * | 3/1998 | |
| JP | 11270647 A | * | 10/1999 | |
| JP | 2001165274 A | * | 6/2001 | |
| JP | 2003028267 A | * | 1/2003 | |
| JP | 2004076881 A | * | 3/2004 | |
| JP | 2006090436 A | * | 4/2006 | |
| JP | 2006097831 A | * | 4/2006 | |

* cited by examiner

*Primary Examiner*—Richard W L Ridley
*Assistant Examiner*—Phillip Johnson
(74) *Attorney, Agent, or Firm*—Babcock IP, PLLC

(57) ABSTRACT

In a ball circulating groove structure of a ball nut, a deflector is provided with an inner collar extending along a penetrating direction of a hole of the ball nut and engaging with the ball nut in a side of an inner surface of the ball nut, and an outer collar engaging with the ball nut in a side of an outer surface of the ball nut.

6 Claims, 7 Drawing Sheets

BALL CIRCULATING GROOVE STRUCTURE OF BALL NUT

BACKGROUND OF THE INVENTION

1. Field of the Invention

The present invention relates to a ball circulation groove structure of a ball nut.

2. Description of the Related Art

As a ball circulation groove structure of a ball nut in which the ball nut, a thread shaft, and a ball are combined, and a thread shaft is linearly moved on the basis of a rotation of the ball nut, there is a structure in which a deflector is formed by a resin in a hole penetrating from an inner surface of the ball nut to an outer surface, adjacent spiral grooves of the ball nut are joined by an S-shaped return groove of the deflector, and a ball rolling along the spiral groove of the thread shaft is guided along a peak portion formed between the adjacent spiral grooves of the thread shaft by the return groove of the deflector and is returned to the adjacent spiral groove of the thread shaft over the peak portion for recirculation, as described in Japanese Patent Publication No. 61-45096 (patent document 1).

In the ball circulation groove structure of the ball nut described in the patent document 1, the deflector is formed by filling a molten resin in a hole of the steel ball nut. Accordingly, the resin deflector contracts within the hole of the ball nut at a time of a low temperature, on the basis of a difference of a coefficient of linear expansion between the ball nut and the deflector. Therefore, the deflector rattles within the hole of the balll nut, a step is generated in a connection portion between the return groove of the deflector and the spiral groove of the ball nut, and there is a risk that the step obstructs smooth rolling of the ball nut.

SUMMARY OF THE INVENTION

An object of the present invention is to prevent play from being generated in a resin deflector with respect to a hole of a ball nut, in a ball circulating groove structure of the ball nut.

The present invention relates to a ball circulating groove structure of a ball nut structured such that a deflector is molded by resin in a hole penetrating from an inner surface to an outer surface of a ball nut, adjacent spiral grooves of the ball nut are connected by an S-shaped return groove of the deflector, and a ball rolling along a spiral groove of a thread shaft is guided along a peak portion formed between the adjacent spiral grooves of the thread shaft by the return groove of the deflector so as to be returned to the adjacent spiral groove of the thread shaft while getting over the peak portion and recirculating. The deflector is provided with an inner collar extending in a penetrating direction of the hole of the ball nut and engaging with the ball nut in a side of an inner surface of the ball nut, and an outer collar engaging with the ball nut in a side of an outer surface of the ball nut.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
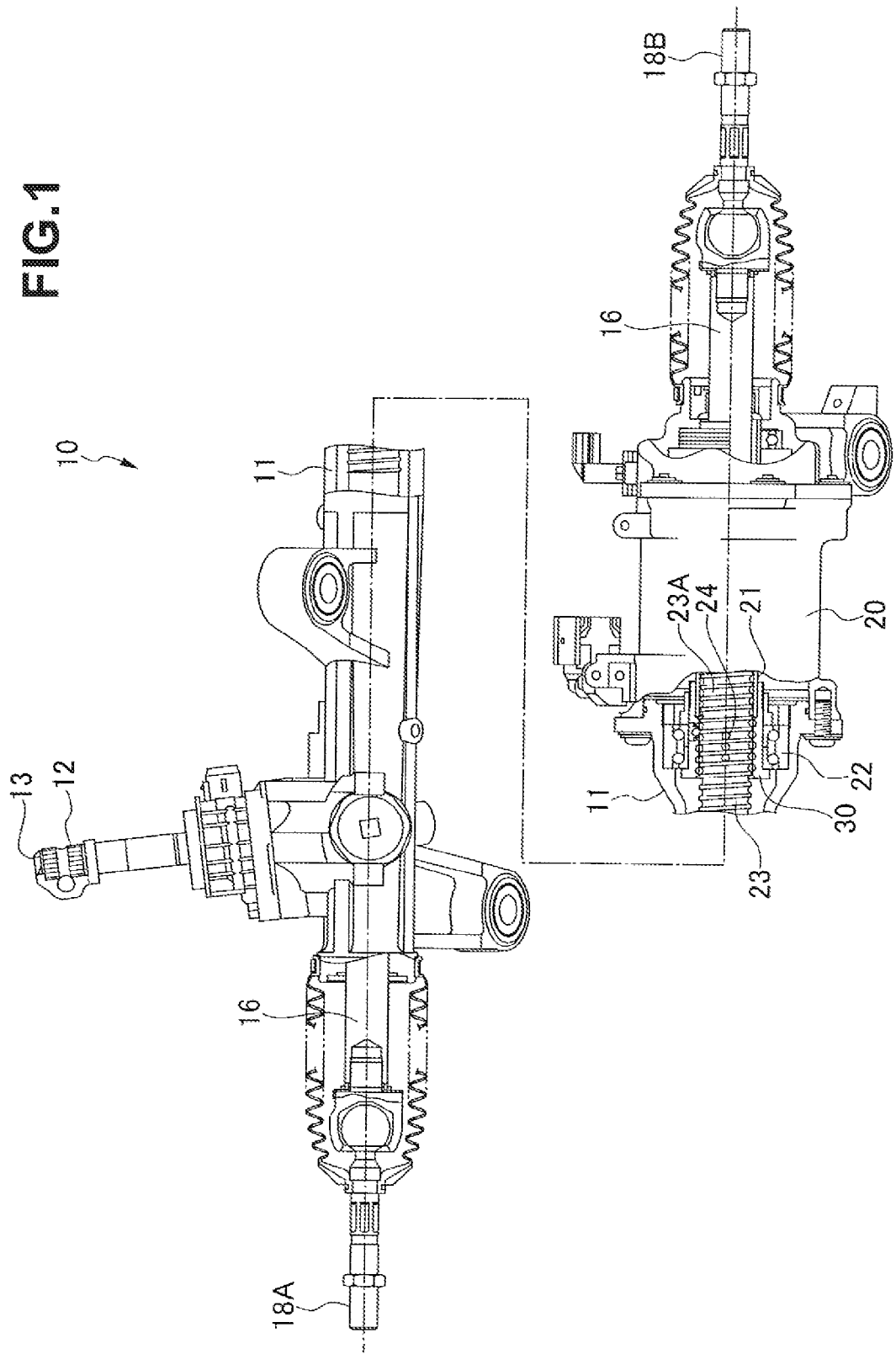
FIG. 1 is a front elevational view showing a main portion of a motor-driven power steering apparatus in a rupturing manner.
Figure 2:
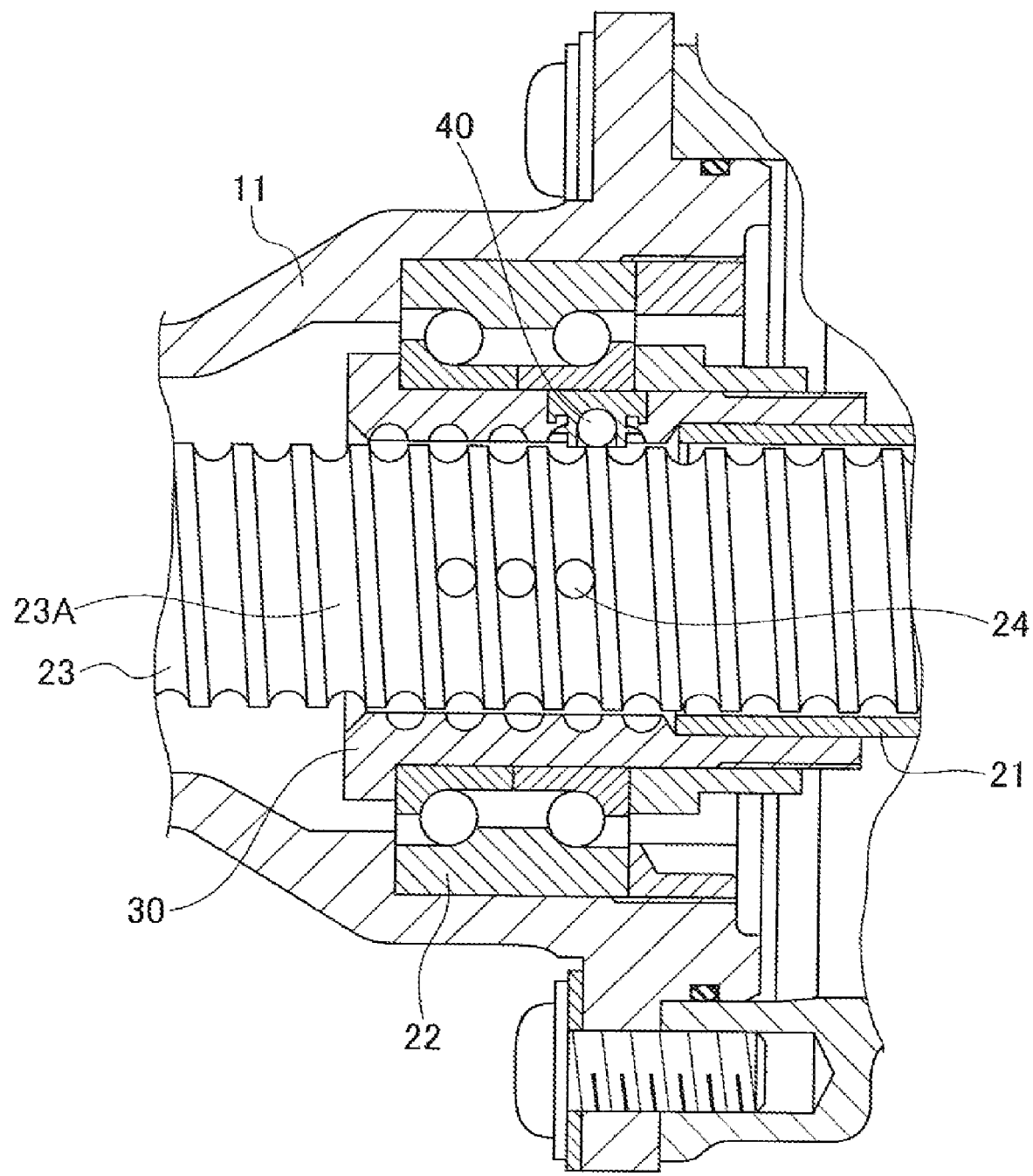
FIG. 2 is a cross sectional view showing the main portion in FIG. 1 in an enlarged manner.

A motor-driven power steering apparatus 10 has a housing 11, as shown in FIGS. 1 and 2. Further, an output shaft 14 (not shown) is coupled to an input shaft 12 (a steering input shaft) to which a steering wheel is connected, via a torsion bar 13, a pinion 15 (not shown) is provided in the output shaft 14, and a rack shaft 16 provided with a rack engaging with the pinion 15 is supported to the housing 11 so as to be movable right and left. A steering torque detecting apparatus 17 (not shown) is provided between the input shaft 12 and the output shaft 14. The steering torque detecting apparatus 17 detects a steering torque on the basis of a relative rotational displacement generated between the input shaft 12 and the output shaft 14 by an elastic torsional deformation of the torsion bar 13 caused by an application of the steering torque from the steering wheel to the output shaft 14.

The motor-driven power steering apparatus 10 is structured such that both end portions of the rack shaft 16 are protruded to right and left sides of the housing 11, tie rods 18A and 18B are coupled to the end portions, and left and right wheels can he steered via the tie rods 18A and 18B on the basis of a lateral movement of the rack shaft 16.

The motor-driven power steering apparatus 10 is structured such that an electric motor 20 is arranged in the periphery of the rack shaft 16 within the housing 11. The electric motor 20 is constituted by a stator (a magnet) fixed to an inner periphery of the housing 11, a rotor in which a coil is wound around an iron core, and a sleeve 21 integrally formed with an inner periphery of the rotor. The sleeve 21 is coaxially arranged with the rack shaft 16 so as to be spaced from an outer periphery of the rack shaft 16, and is rotatably supported to the housing 11.

The motor-driven power steering apparatus 10 is structured such that a ball nut 30 is arranged around the rack shaft 16 near a side of the electric motor 20 within the housing 11, and the ball nut 30 is supported to the housing 11 by a bearing 22 constituted by an angular ball bearing. At this time, the sleeve 21 of the electric motor 20 is coaxially pressure inserted (or may be coaxially pressure inserted via a torque limiter) to an inner periphery in one end side of the ball nut 30. On the other hand, the rack shaft 16 is provided with a thread shaft 23 in an outer periphery. The thread shaft 23 and the ball nut 30 are engaged with each other while holding a steel ball 24 between a spiral groove 23A and a spiral groove 31 thereof. A rotation of the ball nut 30 generated by driving the electric motor 20 is converted into a linear motion of the rack shaft 16 by the thread shaft 23.

Accordingly, in the motor-driven power steering apparatus 10, in the case that the steering torque detected by the steering torque detecting apparatus 17 gets over a predetermined value, the electric motor 20 is driven so as to rotate the ball nut 30, and the rotation of the ball nut 30 is converted into the linear motion of the rack shaft 16 by the thread shaft 23 so as to apply a steering assist force to the wheel working with the rack shaft 16.

Figure 3:
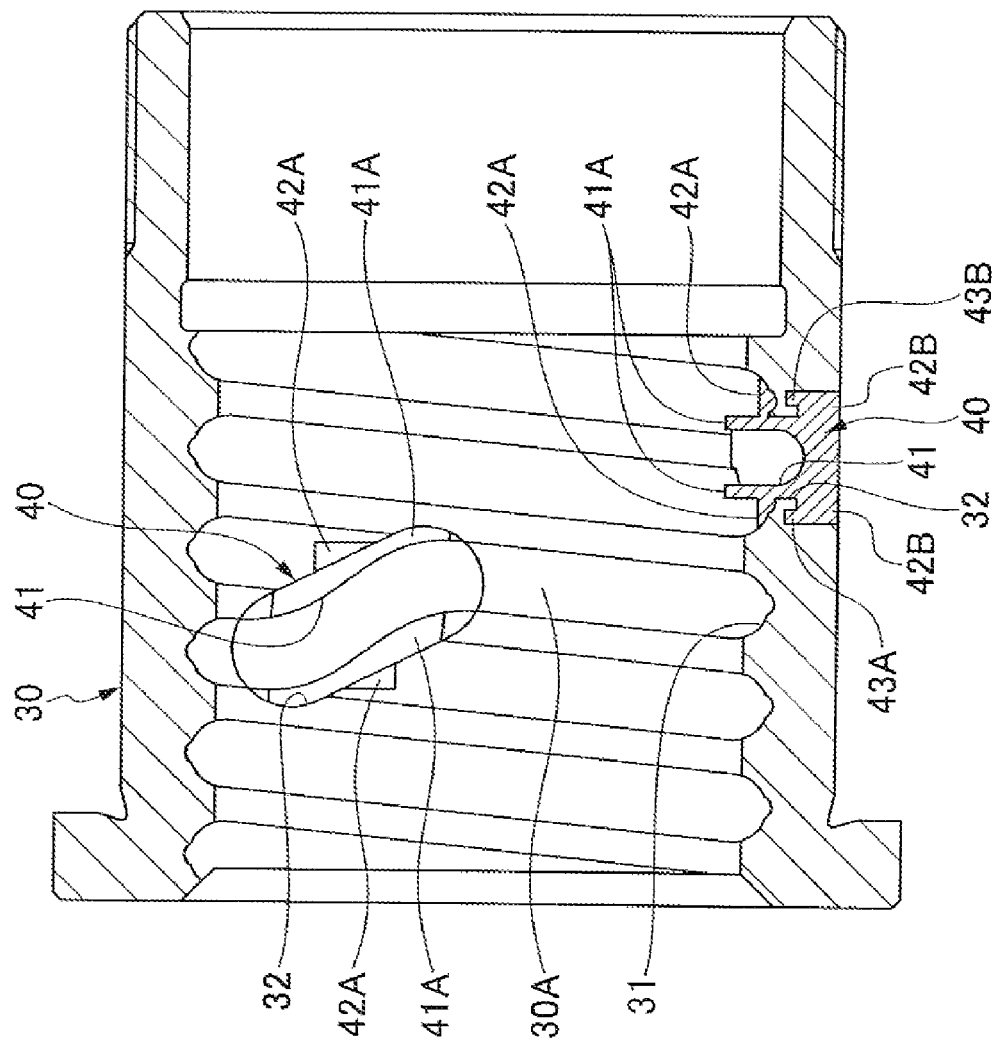
FIG. 3 is a cross sectional view showing a ball nut.
Figure 4:
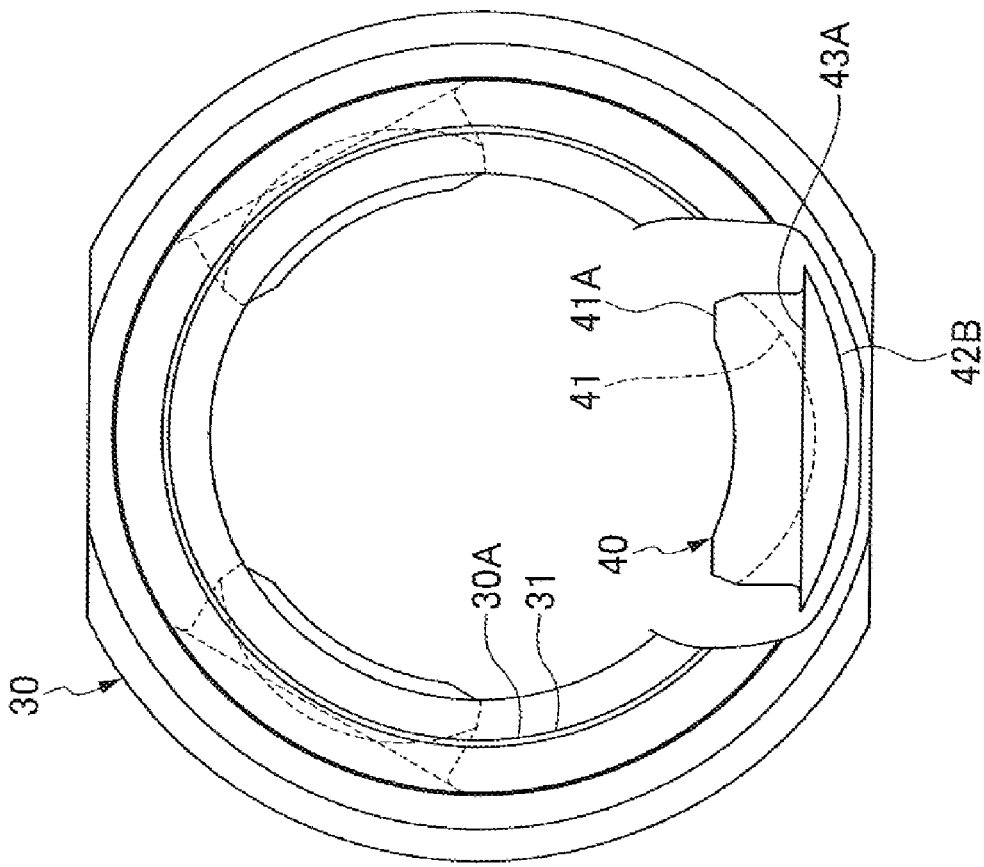
FIG. 4 is an end elevational view showing the ball nut.
Figure 5:
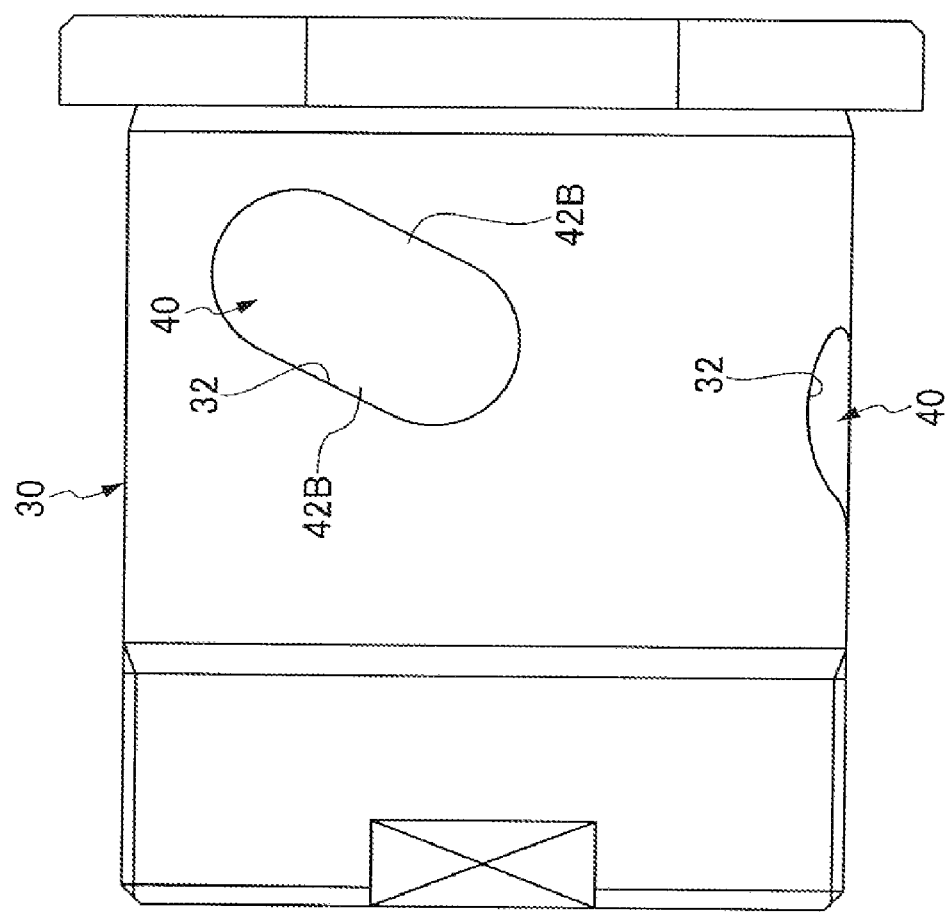
FIG. 5 is a side elevational view showing the ball nut.

The ball nut 30 is provided with a ball circulating groove 30A as described below. The ball nut 30 has an inner surface loosely fitted to the thread shaft 23, and is provided with a spiral groove 31 corresponding to the spiral groove 23A of the thread shaft 23 in the inner surface, as shown in FIGS. 3 to 5. Both the spiral grooves 23A and 31 are formed in a circular arc cross sectional shape, and hold a plurality of balls 24. In this case, the ball nut 30 has a hole 32 penetrating from an inner surface to an outer surface, which is filled with a molten resin at a time of manufacture to form a deflector 40. The deflector 40 is provided with a long S-shaped return groove 41 having a deeper portion than the spiral groove 31 of the ball nut 30, the adjacent spiral grooves 31 of the ball nut 30 are joined by the return groove 41 of the deflector 40, and one turn of ball circulating groove 30A is formed. The bah 24 rolling along the spiral groove 23A of the thread shaft 23 is guided along a peak portion formed between the adjacent spiral grooves 23A and 23A of the thread shaft 23, by the return groove 41 of the deflector 40, and is returned to the adjacent spiral groove 23A of the thread shaft 23 while getting over the peak portion so as to be circulated. Since the ball 24 is rolled along the ball circulating groove 30A of the ball nut 30, and along the spiral groove 23A of the thread shaft 23 and the ball circulating groove 30A (the spiral groove 31 and the return groove 41) of the ball nut 30, the thread shaft 23 and the ball nut 30 are relatively spirally moved.

The ball nut 30 has three sets of ball circulating grooves 30A in the present embodiment. Accordingly, the hole 32 is provided at three positions which are spaced in an axial direction of the ball nut 30, the holes 32 are arranged so as to be spaced at 120 degree in a circumferential direction of the ball nut 30, and the deflector 40 is provided in each of the holes 32.

Accordingly, in order to prevent the play from being generated in the resin deflector 40 with respect to the hole 32 of the ball nut 30, the ball nut 30 and the deflector 40 are provided with the following structure.

Figure 6:
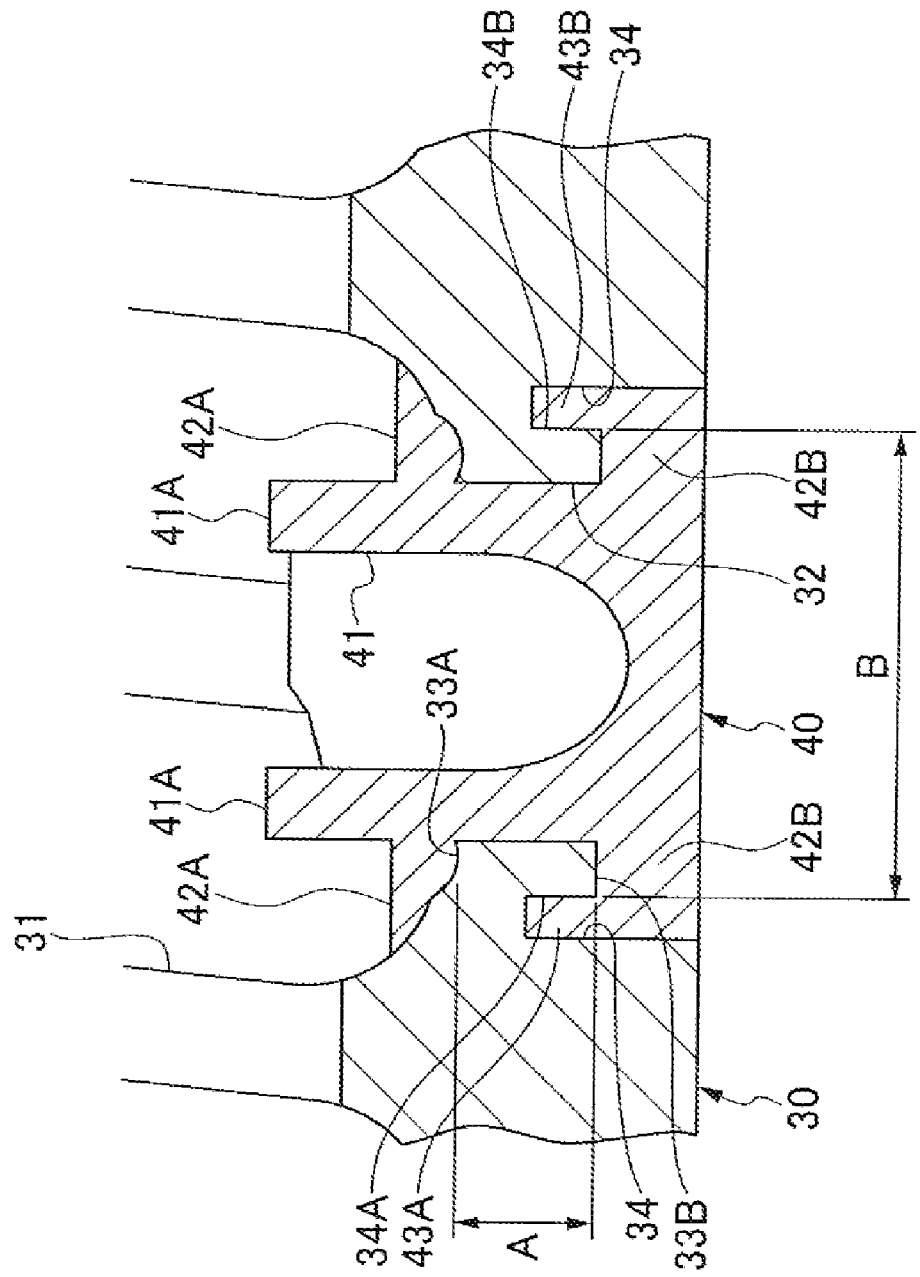
FIG. 6 is a cross sectional view showing a main portion in FIG. 3 in an enlarged manner.

The deflector 40 is provided with an inner collar 42A and an outer collar 42B in accordance with a resin molding, as shown in FIG. 6. The inner collar 42A extends along a penetrating direction of the hole 32 of the ball nut 30, and is engaged with the ball nut 30 in a side of an inner surface of the ball nut 30. The outer collar 42B is engaged with the ball nut 30 in a side of an outer surface of the ball nut 30. In the present embodiment, the right and left inner collars 42A are protruded to right and left, side walls 41A forming the return groove 41 of the deflector 40, and each of the inner collars 42A is engaged with an inner engagement surface 33A formed in a concave manner in the inner surface of the ball nut 30, at a time of forming the deflector 40 by resin. Further, the right and left outer collars 42B (in which the right and left outer collars 42B may be continuously formed with each other so as to form a single annular collar) are protruded to both sides of the deflector 40 extending along the axial direction of the ball nut 30 in an outer surface side of the deflector 40 which is flush with the outer surface of the ball nut 30, and each of the outer collars 42B is engaged with the outer engagement surface 33B provided in a concave manner in the outer surface of the ball nut 30. The deflector 40 is fitted within the hole with no play at an initial high-temperature time when the deflector 40 is formed in the hole 32 of the ball nut 30 by resin. When the deflector 40 contracts at a low-temperature time, the inner collar 42A and the outer collar 42B of the deflector 40 pinch a portion A (an interval between the inner engagement surface 33A and the outer engagement surface 33B) shown in FIG. 5 of the ball nut 30 in a direction of extending in the penetrating direction of the hole 32 in the ball nut 30, prevent the deflector 40 from rattling within the hole 32, and do not generate the step of the connection portion between the return groove 41 of the deflector 40 and the spiral groove 31 of the ball nut 30.

Further, the deflector 40 is provided with collars 43A and 43B engaging with the ball nut 30 by being molded by resin, in both sides intersecting in the penetrating direction of the hole 32 of the ball nut 30, both sides along the axial direction of the ball nut 30 in the present embodiment (or both sides along the peripheral direction of the ball nut 30), as shown in FIG. 6. In the present embodiment, at a time of forming the deflector 40 by resin, the collars 43A and 43B are protruded from the outer side toward the inner side along the radial direction of the ball nut 30 in the right and left outer collars 42B provided in both sides of the deflector 40, each of the collars 43A and 43B is engaged into a concave portion 34 provided in a concave manner along the hole 32 of the ball nut 30, and the respective collars 43A and 43B are engaged with both side engagement surfaces 34A and 34B intersecting the penetrating direction of the hole 32 of the ball nut 30. The deflector 40 is fitted into the hole 32 with no play at an initial high temperature time formed by resin in the hole 32 of the ball nut 30. The collar 43A and the collar 43B of the deflector 40 pinch a portion B (an interval between both the side engagement surfaces 34A and 34B) shown in FIG. 5 of the ball nut 30 in a direction intersecting the penetrating direction of the hole 32 in the ball nut 30, prevent the deflector 40 from rattling within the hole 32, and do not generate a step in the connection portion between the return groove 41 of the deflector 40 and the spiral groove 31 of the ball nut 30.

Figure 7:
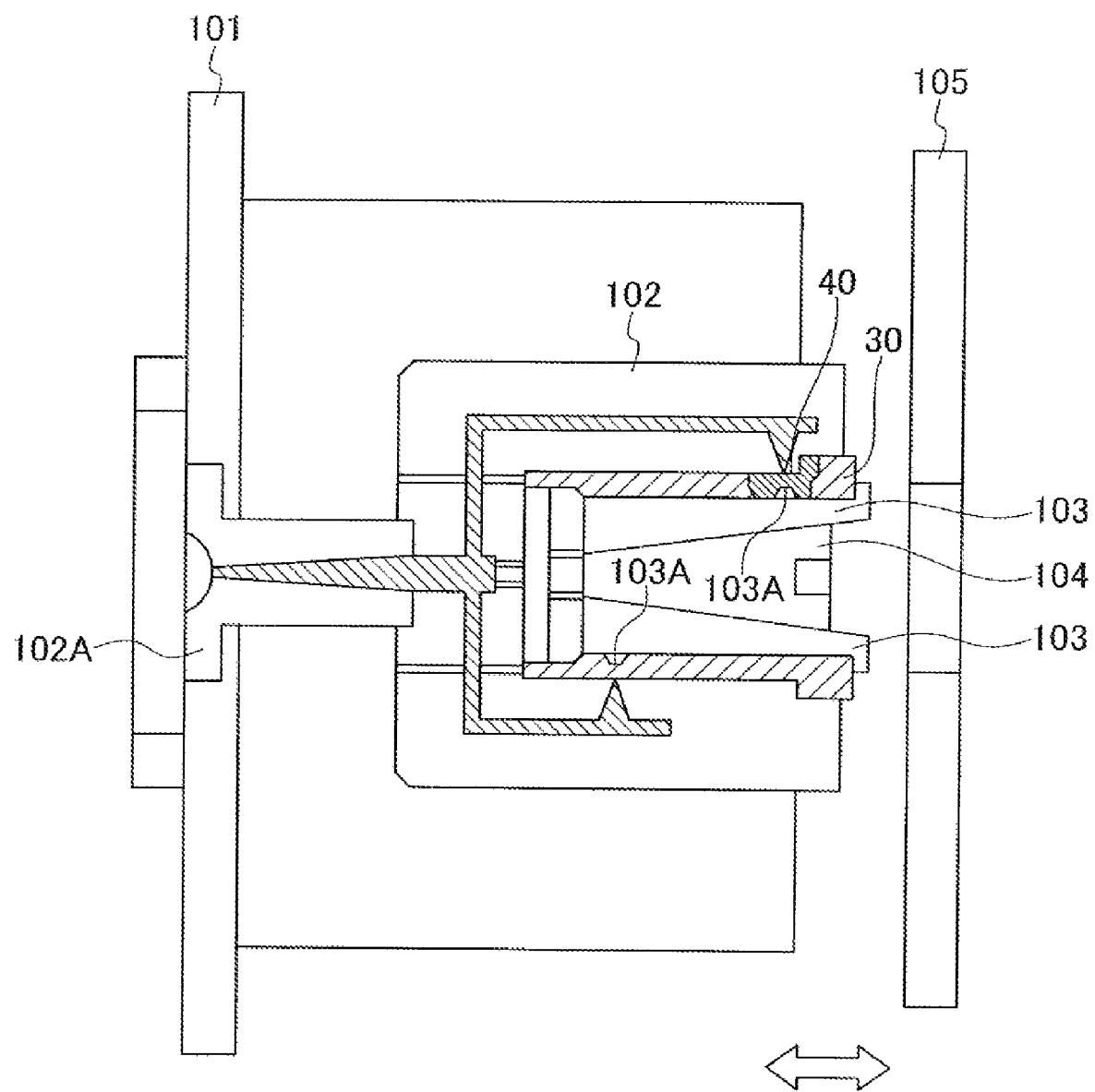
FIG. 7 is a schematic view showing a forming apparatus forming a deflector in the ball nut.

Next, a description will be given of a method of forming the deflector 40 by resin in the hole 32 of the ball nut 30 (FIG. 7).

(1) The ball nut 30 is set in a metal mold 102 provided in a fixed plate 101 of a resin injection molding apparatus.

(2) A plural-divided core mold, a three-part core mold 103 in the present embodiment is inserted to an inner side of the ball nut 30. The core mold 103 is divided into three pieces in a circumferential direction of the ball nut 30. A portion corresponding to the hole 32 of the ball nut 30 in an outer surface of the core mold 103 is set to a deflector forming portion, and is provided with a convex portion 103A corresponding to the return groove 41 of the deflector 40. An inner surface of the core mold 103 is formed as a taper surface.

(3) A collet 104 is inserted to the tapered inner surface of all the core molds 103 so as to extrude each of the core molds 103 and press an outer surface of each of the core molds 103 to the inner surface of the ball nut 30. The hole 32 of the ball nut 30 is closed by the deflector forming portion of the core mold 103.

(4) A movable plate 105 is press applied to the metal mold 102 of the fixed plate 101. A molten resin (for example, PPS polyphenylene sulfide) is filled in the hole 32 of the ball nut 30 from a spool 102A of the metal mold 102.

(5) After the resin filled in the hole 32 of the ball nut 30 is solidified and the deflector 40 is formed, the collet 104 is drawn off, the core mold 103 is taken off, and the ball nut 30 is taken out.

In accordance with the present embodiment, the following operations and effects can be achieved.

(a) The structure is made such that the resin deflector 40 is provided with the inner collar 42A extending along the penetrating direction of the hole 32 of the ball nut 30, and engaged with the ball nut 30 in the side of the inner surface of the ball nut 30, and the outer collar 42B engaged with the ball nut 30 in the side of the outer surface of the ball nut 30. Accordingly, even if the deflector 40 contracts within the hole 32 of the ball nut 30 due to the difference of the coefficient of linear expansion between the steel ball nut 30 and the deflector 40, the inner collar 42A and the outer collar 42B of the deflector 40 pinch the ball nut 30 in the direction along the penetrating direction of the hole 32, thereby preventing the deflector 40 from rattling within the hole 32 of the ball nut 30. Accordingly, it is possible to prevent the step from being generated in the connection portion between the return groove 41 of the deflector 40 and the spiral groove 31 of the ball nut 30, and it is possible to secure a smooth rolling cumulating motion of the ball 24.

(b) The structure is made such that the deflector 40 is provided with both the side collars 43A and 43B engaging with the ball nut 30 in both sides intersecting the penetrating direction of the hole 32 of the ball nut 30. Accordingly, when the deflector 40 contracts within the hole 32 of the ball nut 30 as mentioned in the item (a), both the side collars 43A and 43B of the deflector 40 also pinch the ball nut 30 in the direction intersecting the penetrating direction of the hole 32, thereby further preventing the deflector 40 from rattling within the hole 32 of the ball nut 30. Accordingly, it is possible to further prevent the step from being generated in the connection portion between the return groove 41 of the deflector 40 and the spiral groove 31 of the ball nut 30, and it is possible to further secure the smooth rolling circulating motion of the ball 24.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A ball circulating groove structure of a ball nut structured such that a deflector is molded by resin in a hole penetrating from an inner surface to an outer surface of a ball nut, adjacent spiral grooves of the ball nut are connected by an S-shaped return groove of the deflector, and a ball rolling along a spiral groove of a thread shaft is guided along a peak portion formed between the adjacent spiral grooves of the thread shaft by the return groove of the deflector so as to be returned to the adjacent spiral groove of the thread shaft while getting over the peak portion and circulate, wherein the deflector is provided with an inner collar extending in a penetrating direction of the hole of the ball nut and contacting the ball nut on the inner surface of the ball nut, and an outer collar contacting the ball nut on the outer surface of the ball nut; and the inner collar is engaged with an inner engagement surface provided in a concave manner on the inner surface of the ball nut, and the outer collar is engaged with an outer engagement surface provided between a side engagement surface and the hole.

2. A ball circulating groove structure of a ball nut structured such that a deflector is molded by resin in a hole penetrating from an inner surface to an outer surface of a ball nut, adjacent spiral grooves of the ball nut are connected by an S-shaped return groove of the deflector, and a ball rolling along a spiral groove of a thread shaft is guided along a peak portion formed between the adjacent spiral grooves of the thread shaft by the return groove of the deflector so as to be returned to the adjacent spiral groove of the thread shaft while getting over the peak portion and circulate, wherein the deflector is provided with an inner collar extending in a penetrating direction of the hole of the ball nut and contacting the ball nut on the inner surface of the ball nut, and an outer collar contacting the ball nut on the outer surface of the ball nut;

wherein the outer collar extended in the penetrating direction contacts the ball nut along side engagement surfaces of the ball nut separate from the hole; and wherein the inner collar is engaged with an inner engagement surface provided in a concave manner on the inner surface of the ball nut, and the outer collar is engaged with an outer engagement surface provided between the side engagement surfaces and the hole.

3. A ball circulating groove structure of a ball structured such that a deflector is molded by resin in a hole penetrating from an inner surface to an outer surface of a ball nut, adjacent spiral grooves of the ball nut are connected by an S-shaped return groove of the deflector, and a ball rolling along a spiral groove of a thread shaft is guided along a peak portion formed between the adjacent spiral grooves of the thread shaft by the return groove of the deflector so as to be returned to the adjacent spiral groove of the thread shaft while getting over the peak portion and circulate, wherein the deflector is provided with an inner collar extending in a penetrating direction of the hole of the ball nut and contacting the ball nut on the inner surface of the ball nut, and an outer collar contacting the ball nut on the outer surface of the ball nut;

wherein the ball nut has holes at three positions spaced at 120 degrees in a circumferential direction, and the deflector is provided in each of the holes; and wherein the inner collar is engaged with an inner engagement surface provided in a concave manner on the inner surface of the ball nut, and the outer collar is engaged with an outer engagement surface provided between a side engagement surface and the hole.

4. A ball circulating groove structure of a ball nut as claimed in claim 2, wherein the ball nut has holes at three positions spaced at 120 degrees in a circumferential direction, and the deflector is provided in each of the holes.

5. A ball circulating groove structure of a ball nut structured such that a deflector is molded by resin in a hole penetrating from an inner surface to an outer surface of a ball nut, adjacent spiral grooves of the ball nut are connected by an S-shaped return groove of the deflector, and a ball rolling along a spiral groove of a thread shaft is guided along a peak portion formed between the adjacent spiral grooves of the thread shaft by the return groove of the deflector so as to be returned to the adjacent spiral groove of the thread shaft while getting over the peak portion and circulate, wherein the deflector is provided with an inner collar extending in a penetrating direction of the hole of the ball nut and contacting the ball nut on the inner surface of the ball nut, and an outer collar contacting the ball nut on the outer surface of the ball nut;

wherein the outer collar protrudes to both sides of the deflector extending along the axial direction of the ball nut, in an outer surface side of the deflector which is flush with the outer surface of the ball nut; and wherein the inner collar is engaged with an inner engagement surface provided in a concave manner on the inner surface of the ball nut, and the outer collar is engaged with an outer engagement surface provided between a side engagement surface and the hole.

6. A ball circulating groove structure of a ball nut as claimed in claim 2, wherein the outer collar protrudes to both sides of the deflector extending along the axial direction of the ball nut, in an outer surface side of the deflector which is flush with the outer surface of the ball nut.

* * * * *